US008627138B1

(12) United States Patent  
Clark et al.

(10) Patent No.: US 8,627,138 B1  
(45) Date of Patent: Jan. 7, 2014

(54) DATA PROTECTION SYSTEM AND METHOD

(75) Inventors: Roy E. Clark, Hopkinton, MA (US); Robert C. Solomon, Kensington, NH (US)

(73) Assignee: EMC Corporation, Hopkinton, MA (US)

( * ) Notice: Subject to any disclaimer, the term of this patent is extended or adjusted under 35 U.S.C. 154(b) by 91 days.

(21) Appl. No.: 12/732,330

(22) Filed: Mar. 26, 2010

(51) Int. Cl.
*G06F 11/00* (2006.01)

(52) U.S. Cl.
USPC .......................................... 714/4.4; 714/6.31

(58) Field of Classification Search
None
See application file for complete search history.

(56) References Cited

U.S. PATENT DOCUMENTS

| 5,673,382 | A  | * | 9/1997  | Cannon et al. ............... 714/6.31 |
| 7,043,665 | B2 | * | 5/2006  | Kern et al. ................... 714/5.11 |
| 7,356,734 | B2 | * | 4/2008  | Ricart et al. ................... 714/20 |
| 7,444,552 | B2 | * | 10/2008 | Kilian .............................. 714/43 |
| 7,694,169 | B2 | * | 4/2010  | Slater et al. .................... 714/4.1 |
| 7,770,057 | B1 | * | 8/2010  | Graham et al. .............. 714/6.12 |
| 2005/0172162 | A1 | * | 8/2005  | Takahashi et al. ............... 714/4 |
| 2007/0174715 | A1 | * | 7/2007  | Kilian ............................. 714/38 |
| 2007/0220319 | A1 | * | 9/2007  | Desai et al. ..................... 714/13 |
| 2009/0313389 | A1 | * | 12/2009 | McCabe et al. ............... 709/253 |
| 2011/0208994 | A1 | * | 8/2011  | Chambliss et al. .......... 714/6.24 |

\* cited by examiner

*Primary Examiner* — Christopher McCarthy
(74) *Attorney, Agent, or Firm* — Brian J. Colandreo; Mark H. Whittenberger; Holland & Knight LLP

(57) ABSTRACT

A system, computer-implemented method, and a computer program product for monitoring a first data portion written to a first storage device accessible by a first computing device. At least a second data portion written to at least a second storage device accessible by at least a second computing device is monitored. Recovery data is written to a recovery storage device external to and accessible by the first and the at least a second computing devices, wherein the recovery data is based, at least in part, upon the first and second data portions.

18 Claims, 4 Drawing Sheets

DATA PROTECTION SYSTEM AND METHOD

TECHNICAL FIELD

This disclosure relates to data systems and, more particularly, to data protection systems.

BACKGROUND

Data durability is of paramount importance at an enterprise level, as device failure may result in the loss of data. Accordingly, if a reliable data protection system is not utilized, permanent data loss may result.

While various types of data arrays may be utilized to protect data stored within a centralized data repository, data is often stored within internal memory devices located within separate and discrete computing devices. Often, this data stored within these internal memory devices may be unprotected and, therefore, a device failure may result in permanent (i.e., non-recoverable) data loss.

SUMMARY OF DISCLOSURE

In a first implementation, a computer-implemented method includes monitoring a first data portion written to a first storage device accessible by a first computing device. At least a second data portion written to at least a second storage device accessible by at least a second computing device is monitored. Recovery data is written to a recovery storage device external to and accessible by the first and the at least a second computing devices, wherein the recovery data is based, at least in part, upon the first and second data portions.

One or more of the following features may be included. The recovery storage device may be accessible by a recovery computing device, and the recovery computing device may be coupled, via a network fabric, to the first computing device and the at least a second computing device. The recovery computing device, the first computing device, and the at least a second computing devices may each be stand alone devices. The recovery data may be an erasure code. The first storage device and the at least a second storage device may be solid state memory devices. The solid state memory devices may be flash memory devices. The first computing device and the at least a second computing device may be server computers.

In another implementation, a computer program product resides on a computer readable medium having a plurality of instructions stored on it. When executed by a processor, the instructions cause the processor to perform operations including monitoring a first data portion written to a first storage device accessible by a first computing device. At least a second data portion written to at least a second storage device accessible by at least a second computing device is monitored. Recovery data is written to a recovery storage device external to and accessible by the first and the at least a second computing devices, wherein the recovery data is based, at least in part, upon the first and second data portions.

One or more of the following features may be included. The recovery storage device may be accessible by a recovery computing device, and the recovery computing device may be coupled, via a network fabric, to the first computing device and the at least a second computing device. The recovery computing device, the first computing device, and the at least a second computing devices may each be stand alone devices. The recovery data may be an erasure code. The first storage device and the at least a second storage device may be solid state memory devices. The solid state memory devices may be flash memory devices. The first computing device and the at least a second computing device may be server computers.

In another implementation, a data protection system includes at least one processor, and at least one memory architecture coupled with the at least one processor. A first software module is executed on the at least one processor and the at least one memory architecture. The first software module is configured to monitor a first data portion written to a first storage device accessible by a first computing device. A second software module is executed on the at least one processor and the at least one memory architecture. The second software module is configured to monitor at least a second data portion written to at least a second storage device accessible by at least a second computing device. A third software module is executed on the at least one processor and the at least one memory architecture. The third software module is configured to write recovery data to a recovery storage device external to and accessible by the first and the at least a second computing devices, wherein the recovery data is based, at least in part, upon the first and second data portions.

One or more of the following features may be included. The recovery storage device may be accessible by a recovery computing device, and the recovery computing device may be coupled, via a network fabric, to the first computing device and the at least a second computing device. The recovery computing device, the first computing device, and the at least a second computing devices may each be stand alone devices. The recovery data may be an erasure code. The first storage device and the at least a second storage device may be solid state memory devices. The solid state memory devices may be flash memory devices. The first computing device and the at least a second computing device may be server computers.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
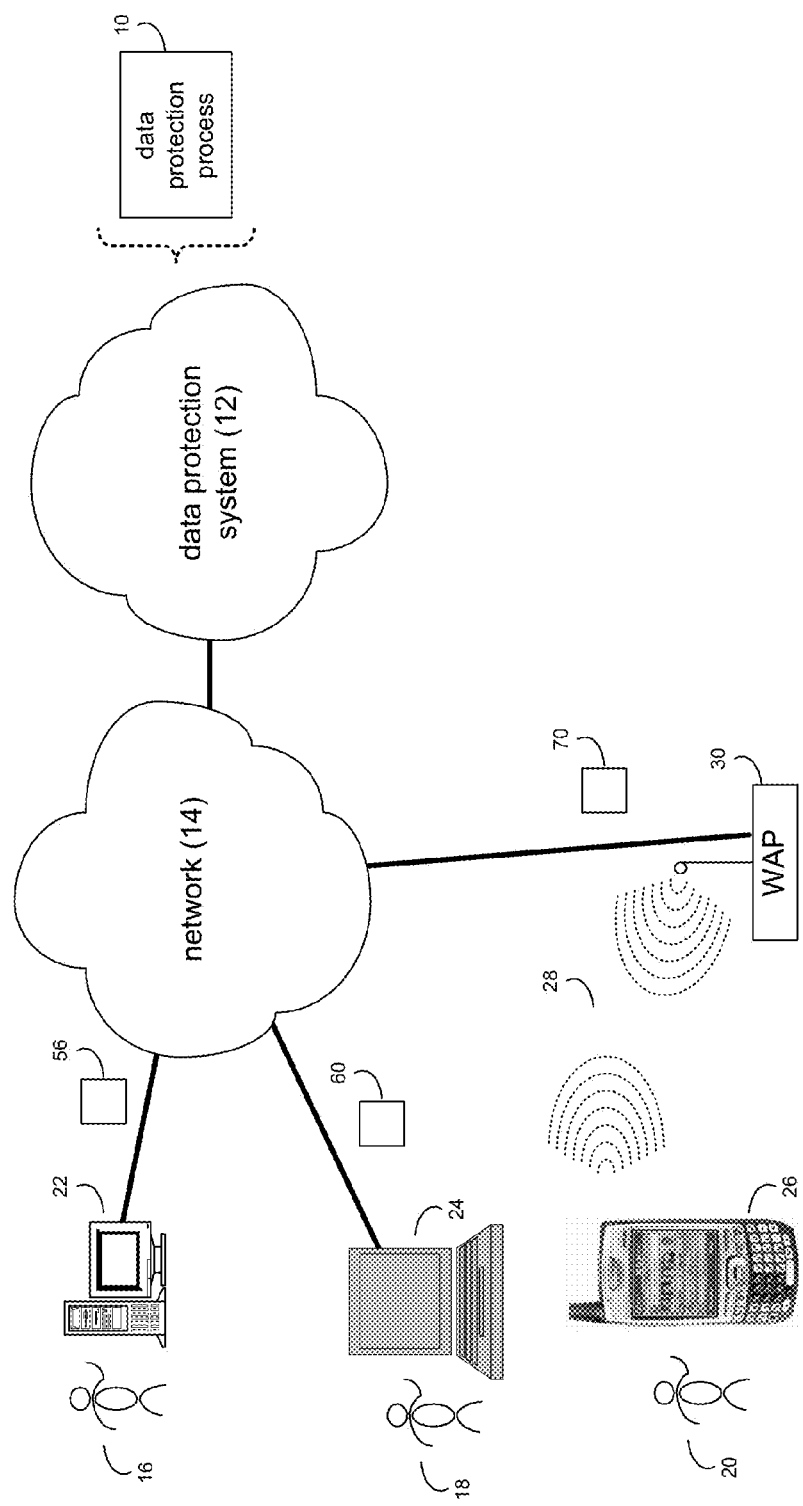
FIG. 1 is a diagrammatic view of a data protection system coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
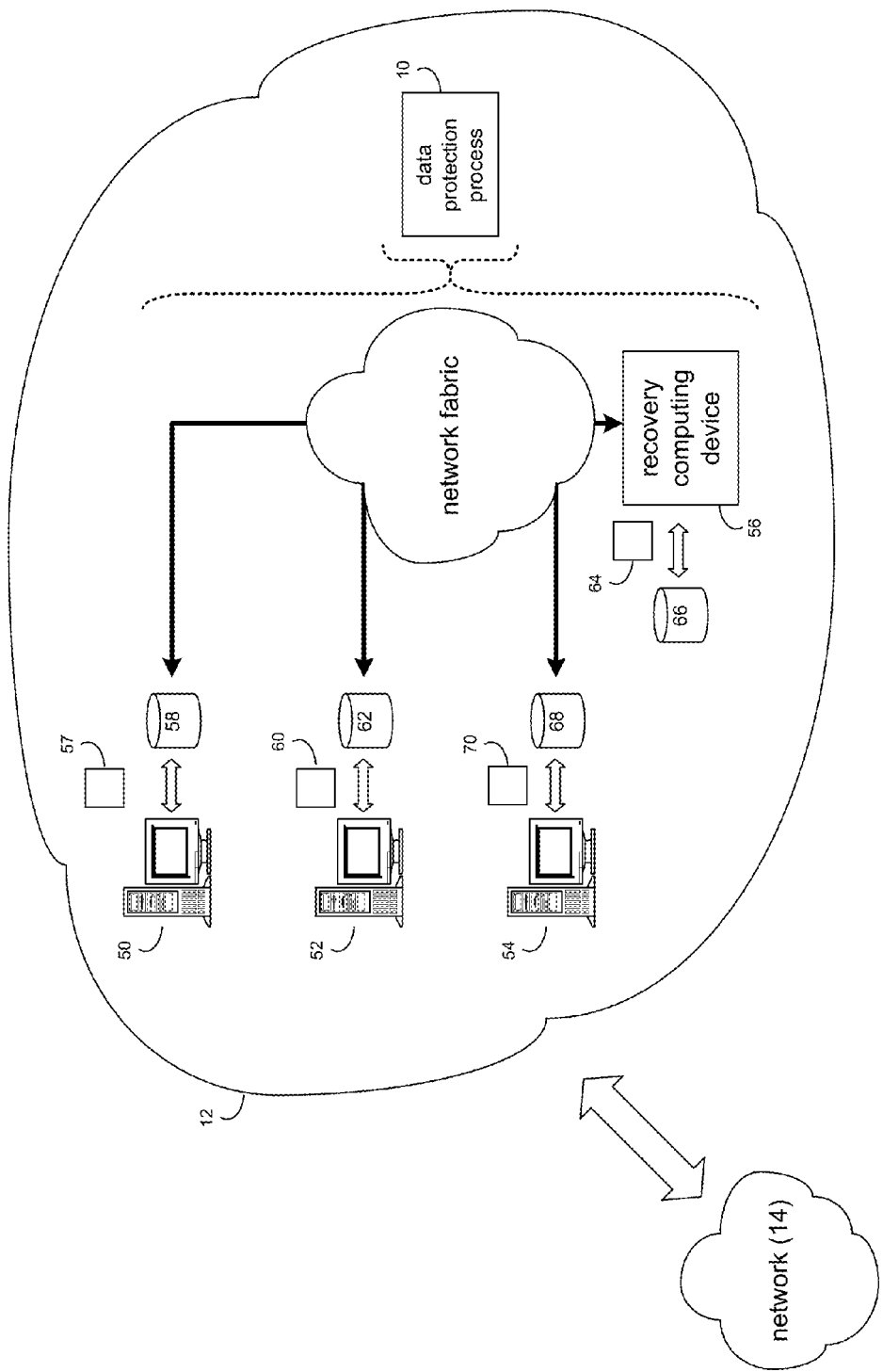
FIG. 2 is a diagrammatic view of the data protection system of FIG. 1.

Referring to FIGS. 1 & 2, there is shown data protection process 10 that may reside on and may be executed by data protection system 12, which may be connected to network 14 (e.g., the Internet or a local area network). Examples of data protection system 12 may include, but are not limited to any combination of computing devices. One exemplary embodiment includes three server computers 50, 52, 54 and recovery computing device 56. Server computers 50, 52, 54 and recovery computing device 56 may be coupled via a network fabric, such as an Ethernet network, a fiber channel network, and/or any other known methodology capable of coupling discrete devices. Server computers 50, 52, 54 and recovery computing device 56 may be configured as stand alone devices.

One or more of the devices included within data protection system 12 (e.g., server computers 50, 52, 54) may be a web server (or a series of servers) running a network operating system, examples of which may include but are not limited to: Microsoft Windows XP Server™; Novell Netware™; or Redhat Linux™, for example.

Server computers 50, 52, 54 may execute a web server application, examples of which may include but are not limited to: IBM WebSphere™, Microsoft IIS™, Novell Webserver™, or Apache Webserver™, that allows for HTTP (i.e., HyperText Transfer Protocol) access to one or more of server computer 50, 52, 54 via network 14. Network 14 may be connected to one or more secondary networks (not shown), examples of which may include but are not limited to: a local area network; a wide area network; or an intranet, for example.

Figure 3:
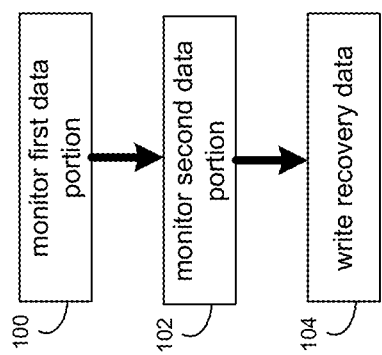
FIG. 3 is a flowchart of a data protection process executed by the data protection system of FIG. 1.

Referring also to FIG. 3 and as will be discussed below in greater detail, data protection process 10 may monitor 100 a first data portion (e.g., data portion 57) written to a first storage device (e.g., storage device 58) accessible by a first computing device (e.g., server computer 50). At least a second data portion (e.g., data portion 60) written to at least a second storage device (e.g., storage device 62) accessible by at least a second computing device (e.g., server computer 52) may be monitored 102. Recovery data (e.g., recovery data 64) may be written 104 to a recovery storage device (e.g., storage device 66) external to and accessible by the first and the at least a second computing devices (e.g., server computers 50, 52), wherein the recovery data (e.g., recovery data 64) is based, at least in part, upon the first and second data portions (e.g., data portions 56, 60).

The instruction sets and subroutines of data protection process 10 may be stored on one or more storage devices included within data protection system 12. For example, the instruction sets and subroutines of data protection process 10 may be stored on one or more of: storage device 58 coupled to server computer 50; storage device 62 coupled to server computer 52; storage device 68 coupled to server computer 54; and storage device 66 coupled to recovery computing device 56. Accordingly, the instruction sets and subroutines of data protection process 10 may be distributed amongst the various devices included within data protection system 12. Examples of storage devices 58, 62, 66, 68 may include but are not limited to solid-state memory devices, such as random access memory (RAM) devices; read-only memory (ROM) devices; and flash-based memory devices (e.g., a flash drive).

The instruction sets and subroutines of data protection process 10 may be executed by one or more processors (not shown) and one or more memory architectures (not shown) incorporated into one or more of: server computer 50; server computer 52; server computer 54; and recovery computing device 56. Accordingly, execution of the instruction sets and subroutines of data protection process 10 may be distributed amongst the various devices included within data protection system 12.

Users 16, 18, 20 may store and/or retrieve various data portions (e.g., data portions 56, 60, 70) from the various devices (e.g., server computers 50, 52, 54) included within data protection system 12 using client electronic devices 22, 24, 26 (respectively). Examples of client electronic devices 22, 24, 26 may include, but are not limited to, personal computer 22, laptop computer 24, personal digital assistant 26, a server computer (not shown), a notebook computer (not shown), a data-enabled, cellular telephone (not shown), and a dedicated network device (not shown). Client electronic devices 22, 24, 26 may each execute an operating system, examples of which may include but are not limited to Microsoft Windows™, Microsoft Windows CE™, Redhat Linux™, or a custom operating system.

The various client electronic devices may be directly or indirectly coupled to network 14. For example, personal computer 22 and laptop computer 24 are shown directly coupled to network 14 via a hardwired network connection. Further, personal digital assistant 26 is shown wirelessly coupled to network 14 via wireless communication channel 28 established between personal digital assistant 26 and wireless access point (i.e., WAP) 30, which is shown directly coupled to network 14. WAP 30 may be, for example, an IEEE 802.11a, 802.11b, 802.11g, 802.11n, Wi-Fi, and/or Bluetooth device that is capable of establishing wireless communication channel 28 between personal digital assistant 26 and WAP 30.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Data Protection Process:

For illustrative purposes, assume that server computers 50, 52, 54 are data servers within a corporate infrastructure and that users 16, 18, 20 are corporate users that use client electronic devices 22, 24, 26 to access (i.e., store and retrieve) data on server computers 50, 52, 54. While in this particular example, data protection system 12 is shown to include three server computers (e.g., server computers 50, 52, 54), this is for illustrative purposes only and is not intended to be a limitation of this disclosure, as other configurations are possible. For example, the number of server computers included within data protections system 12 may be increased/decreased depending upon various design criteria and considerations.

As stated above, data protection process 10 may monitor 100 a first data portion (e.g., data portion 57) written to a first storage device (e.g., storage device 58) accessible by a first computing device (e.g., server computer 50). Assume for illustrative purposes that data portion 57 is written to storage device 58 included within server computer 50 due to actions taken by user 16 on client electronic device 22. For example, data portion 57 may be a word processor file (or a portion thereof) that user 16 would like to store on storage device 58 included within server computer 50. As discussed above, examples of storage device 58 may include but are not limited to solid-state memory devices, such as random access memory (RAM) devices; read-only memory (ROM) devices; and flash-based memory devices (e.g., a flash drive).

Additionally and as stated above, data protection process 10 may monitor 102 at least a second data portion (e.g., data portion 60) written to at least a second storage device (e.g., storage device 62) accessible by at least a second computing device (e.g., server computer 52). Assume for illustrative purposes that data portion 60 is written to storage device 62 included within server computer 52 due to actions taken by user 18 on client electronic device 24. For example, data portion 60 may be a spreadsheet file (or a portion thereof) that user 18 would like to store on storage device 62 included within server computer 52. As discussed above, examples of storage device 62 may include but are not limited to solid-state memory devices, such as random access memory (RAM) devices; read-only memory (ROM) devices; and flash-based memory devices (e.g., a flash drive).

Further assume for illustrative purposes that data portion 70 is written to storage device 68 included within server computer 54 due to actions taken by user 20 on client electronic device 26. For example, data portion 70 may be a presentation file (or a portion thereof) that user 20 would like to store on storage device 68 included within server computer 54. As discussed above, examples of storage device 68 may include but are not limited to solid-state memory devices, such as random access memory (RAM) devices; read-only memory (ROM) devices; and flash-based memory devices (e.g., a flash drive).

Data protection process 10 may calculate recovery data 64, which may be based, at least in part, upon the various data portions (e.g., data portions 56, 60, 70). As discussed above, the recovery data (e.g., recovery data 64) may be written 104 to a recovery storage device (e.g., storage device 66) external to and accessible by the various computing devices (e.g., server computers 50, 52, 54). Illustrative examples of recovery data 64 may include but are not limited to an erasure code and mirrored data.

If recovery data 64 is mirrored data, when recovery data 64 is written 104 to storage device 66, a redundant copy of each of data portions 56, 60, 70 may be stored on storage device 66 that is coupled to recovery computing device 56. As discussed above, examples of storage device 66 may include but are not limited to solid-state memory devices, such as random access memory (RAM) devices; read-only memory (ROM) devices; and flash-based memory devices (e.g., a flash drive). These redundant copies of data portions 56, 60, 70 may be maintained on storage device 66 until one or more of the related original copies (that are stored on storage devices 58, 62, 68 respectively) are overwritten with newer data, at which point a new redundant copy of the overwritten data portion would be written 104 to storage device 66.

Figure 4:
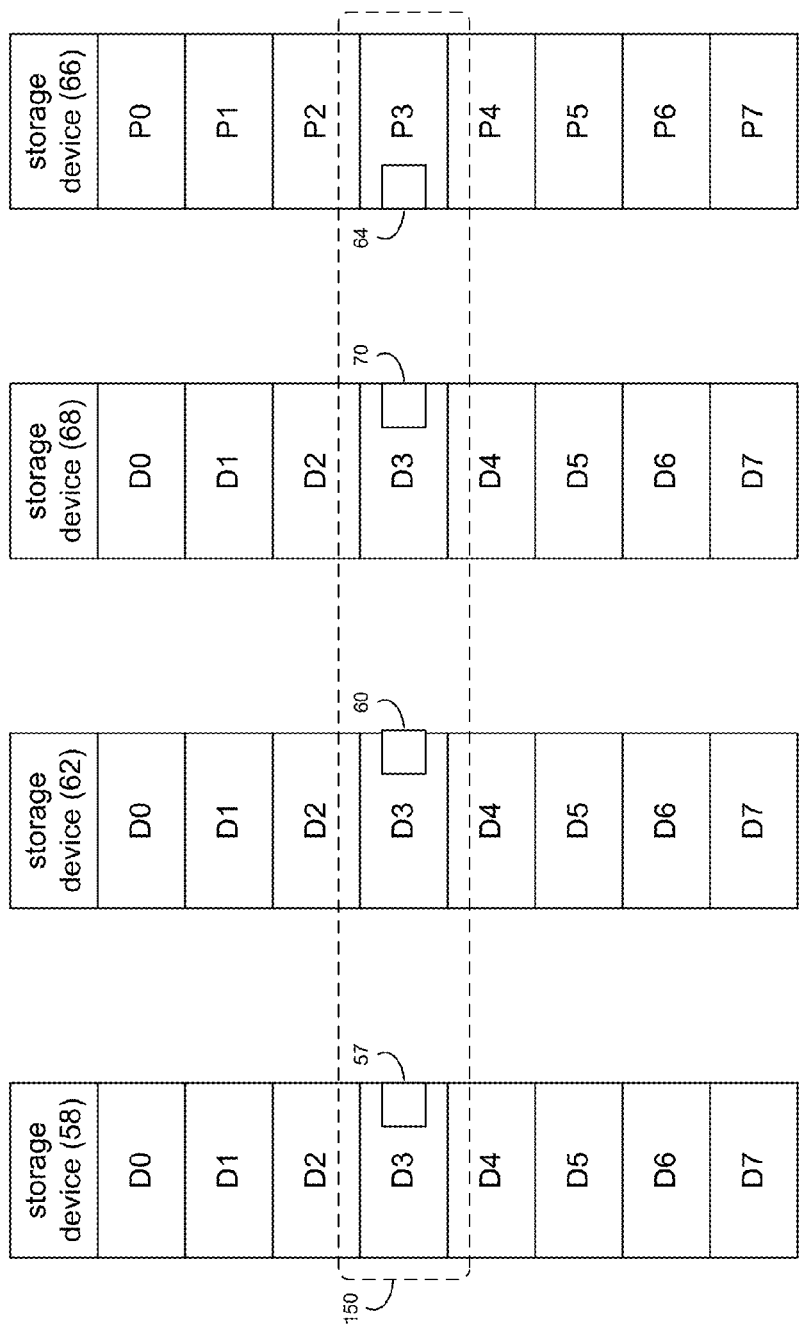
FIG. 4 is a diagrammatic view of various storage devices.

If recovery data 64 is an erasure code (such as parity data), data protection process 10 may calculate the appropriate parity information using one of many known methodologies. For example and referring also to FIG. 4, each of storage devices 58, 62, 66, 68 may be divided into an equal number of data storage areas in which corresponding data storage areas across the various storage devices form a data stripe. For example and for illustrative purposes only, data area three (i.e., D3) of each of storage devices 58, 62, 68 may be combined with data area three (i.e., P3) of storage device 66 to form data stripe 150. In this particular example, the data stored within data area three (i.e., D3) of each of storage devices 58, 62, 68 may be used to calculate recovery data 64, which in this example is parity data that is stored within data area three (i.e., P3) of storage device 66.

Assume for illustrative purposes that: data portion 57 is stored within data area three (i.e., D3) of storage device 58; data portion 60 is stored within data area three (i.e., D3) of storage device 62; and data portion 70 is stored within data area three (i.e., D3) of storage device 68. Accordingly, data protection process 10 may calculate recovery data 64 (which may be stored within data area three (i.e., P3) of storage device 66) using data portions 56, 60, 70.

For example, when calculating recovery data 64, data protection process 10 may exclusive-or (XOR) data portion 57 and data portion 60. The result of this exclusive-or process may be exclusive-or'd with data portion 70 to generate recovery data 64. Recovery data 64 may be maintained on storage device 66 until one or more of data portions 56, 60, 70 are overwritten with newer data, at which point recovery data 64 would be recalculated by data protection process 10 and updated recovery data 64 would be written 104 to storage device 66.

Assume for illustrative purposes that the value of data portion 57 changes and is overwritten with newer data. Accordingly, the value of recovery data 64 would need to be recalculated and written 104 to storage device 66. For example, when recalculating recovery data 64, the old value of data portion 57 may be exclusive-or'd with the current value of recovery data 64 to extract out the old value of data portion 57. The resulting parity value may be exclusive-or'd with the new value of data portion 57 to generate updated recovery data 64, which may be written 104 to storage device 66.

As an alternative way of generating updated recovery data, the new value of data portion 57 may be exclusive-or'd with the old value of data portion 57, and the result of this process may be exclusive-or'd with the old value of recovery data 64 to generate updated recovery data 64, which may be written 104 to storage device 66.

As is known in the art, in the event of a device failure and/or a data read error that e.g., renders data portion 57 inaccessible, the inaccessible data (e.g., data portion 57) may be recovered using the accessible data portions (e.g., data portion 60 and data portion 70) in combination with recovery data 64.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

A number of implementations have been described. Nevertheless, it will be understood that various modifications may be made. Accordingly, other implementations are within the scope of the following claims.

What is claimed is:
1. A computer-implemented method comprising:
monitoring a first data portion written to a first storage device accessible by a first computing device;
monitoring at least a second data portion written to at least a second storage device accessible by at least a second computing device, wherein the first storage device and the at least a second storage device are solid state memory devices;
writing recovery data to an external recovery storage device accessible by the first and the at least a second computing devices, wherein the recovery data is an erasure code based, at least in part, upon the first and second data portions; and
if a value of the first or second data portion changes, recalculating the recovery data by performing an exclusive OR (XOR) between the first or second data portion and the changed first or second data portion resulting in a parity value, and
performing an XOR between the parity value and the recovery data.
2. The computer-implemented method of claim 1 wherein the recovery storage device is accessible by a recovery computing device, and the recovery computing device is coupled, via a network fabric, to the first computing device and the at least a second computing device.

3. The computer-implemented method of claim 2 wherein the recovery computing device, the first computing device, and the at least the second computing devices are each stand alone devices.

4. The computer-implemented method of claim 1 wherein the solid state memory devices are flash memory devices.

5. The computer-implemented method of claim 1 wherein the first computing device and the at least a second computing device are server computers.

6. The computer-implemented method of claim 1 wherein the recovery data is determined by performing an exclusive OR (XOR) between the first data portion and the second data portion.

7. A computer program product residing on a non-transitory computer readable medium having a plurality of instructions stored thereon that, when executed by a processor, cause the processor to perform operations comprising:
- monitoring a first data portion written to a first storage device accessible by a first computing device;
- monitoring at least a second data portion written to at least a second storage device accessible by at least a second computing device, wherein the first storage device and the at least a second storage device are solid state memory devices;
- writing recovery data to an external recovery storage device accessible by the first and the at least a second computing devices, wherein the recovery data is an erasure code based, at least in part, upon the first and second data portions; and
- if a value of the first or second data portion changes, recalculating the recovery data by performing an exclusive OR (XOR) between the first or second data portion and the changed first or second data portion resulting in a parity value, and
- performing an XOR between the parity value and the recovery data.

8. The computer program product of claim 7 wherein the recovery storage device is accessible by a recovery computing device, and the recovery computing device is coupled, via a network fabric, to the first computing device and the at least a second computing device.

9. The computer program product of claim 8 wherein the recovery computing device, the first computing device, and the at least the second computing devices are each stand alone devices.

10. The computer program product of claim 7 wherein the solid state memory devices are flash memory devices.

11. The computer program product of claim 7 wherein the first computing device and the at least a second computing device are server computers.

12. The computer program product of claim 7 wherein the recovery data is determined by performing an exclusive OR (XOR) between the first data portion and the second data portion.

13. A data protection system comprising:
- at least one processor;
- at least one memory architecture coupled with the at least one processor;
- a first software module executed on the at least one processor and the at least one memory architecture, wherein the first software module is configured to monitor a first data portion written to a first storage device accessible by a first computing device;
- a second software module executed on the at least one processor and the at least one memory architecture, wherein the second software module is configured to monitor at least a second data portion written to at least a second storage device accessible by at least a second computing device, wherein the first storage device and the at least a second storage device are solid state memory devices;
- a third software module executed on the at least one processor and the at least one memory architecture, wherein the third software module is configured to write recovery data to an external recovery storage device accessible by the first and the at least a second computing devices, wherein the recovery data is an erasure code based, at least in part, upon the first and second data portions; and
- if a value of the first or second data portion changes, a fourth software module executed on the at least one processor and the at least one memory architecture, wherein the fourth software module is configured to recalculate the recovery data by performing an exclusive OR (XOR) between the first or second data portion and the changed first or second data portion resulting in a parity value, and
- performing an XOR between the parity value and the recovery data.

14. The data protection system of claim 13 wherein the recovery storage device is accessible by a recovery computing device, and the recovery computing device is coupled, via a network fabric, to the first computing device and the at least a second computing device.

15. The data protection system of claim 14 wherein the recovery computing device, the first computing device, and the at least the second computing devices are each stand alone devices.

16. The data protection system of claim 13 wherein the solid state memory devices are flash memory devices.

17. The data protection system of claim 13 wherein the first computing device and the at least a second computing device are server computers.

18. The data protection system of claim 13 wherein the recovery data is determined by performing an exclusive OR (XOR) between the first data portion and the second data portion.

* * * * *